(12) United States Patent
Lobdell, Sr. et al.

(10) Patent No.: US 12,109,525 B2
(45) Date of Patent: Oct. 8, 2024

(54) V-BANK FILTER

(71) Applicant: Healthway Home Products Company Inc., Pulaski, NY (US)

(72) Inventors: Vincent G. Lobdell, Sr., Pulaski, NY (US); Mitchell Raymond Lobdell, Constantia, NY (US); Xuchen Wang, Pulaski, NY (US); Kevin Guernsey, Constantia, NY (US); Alexander Thomas Frechette, Mexico, NY (US); Timothy George Cusack, Central Square, NY (US); Brooke Alan Rowe, Vernon, NY (US)

(73) Assignee: HEALTHWAY HOME PRODUCTS COMPANY INC., Pulaski, NY (US)

( * ) Notice: Subject to any disclaimer, the term of this patent is extended or adjusted under 35 U.S.C. 154(b) by 66 days.

(21) Appl. No.: 17/395,554

(22) Filed: Aug. 6, 2021

(65) Prior Publication Data

US 2022/0040625 A1 Feb. 10, 2022

Related U.S. Application Data

(60) Provisional application No. 63/063,045, filed on Aug. 7, 2020.

(51) Int. Cl.
*B03C 3/011* (2006.01)
*B01D 46/00* (2022.01)
(Continued)

(52) U.S. Cl.
CPC ..... *B01D 46/4245* (2013.01); *B01D 46/0028* (2013.01); *B01D 46/0032* (2013.01);
(Continued)

(58) Field of Classification Search
CPC .............. B01E 46/121; B01D 46/4245; B01D 46/0028; B01D 46/0032; B01D 46/121;
(Continued)

(56) References Cited

U.S. PATENT DOCUMENTS 3,999,964 A 12/1976 Carr
4,853,005 A * 8/1989 Jaisinghani ............. B03C 3/155
96/60

(Continued)

FOREIGN PATENT DOCUMENTS

CN 204034468 U 12/2014
WO WO 1998/020961 5/1998
(Continued)

OTHER PUBLICATIONS

PCT Application PCT/US2022/026353 International Search Report and Written Opinion dated Jul. 28, 2022.
(Continued)

*Primary Examiner* — Christopher P Jones
*Assistant Examiner* — Sonji Turner
(74) *Attorney, Agent, or Firm* — Brake Hughes Bellermann LLP (57) ABSTRACT

The present disclosure is directed methods and apparatus of a V-Bank filtration system capable of maintaining desired air flow rates while effectively filtering the air. These methods and apparatus charge particles and then capture those particles in a filter medium. Once captured in the filter medium, micro-organisms are exposed to high energy electric fields that may degrade and ultimately destroy the captured micro-organisms. Electric fields generated within portions of the V-Bank filter apparatus may also be contained within the portions of the filter apparatus based on exterior parts of these portions being grounded at Earth ground potential. Magnetic fields (or electro-magnetic fields) associated with
(Continued)

the generated electric fields may also be contained within the portions of the apparatus based on the exterior parts of these portions being grounded.

14 Claims, 8 Drawing Sheets

(51) Int. Cl.
*B01D 46/121* (2022.01)
*B01D 46/42* (2006.01)
*B03C 3/12* (2006.01)

(52) U.S. Cl.
CPC ....... *B01D 46/121* (2022.01); *B01D 46/4209* (2013.01); *B03C 3/011* (2013.01); *B03C 3/12* (2013.01); *B01D 2279/65* (2013.01)

(58) Field of Classification Search
CPC ............ B01D 46/4209; B01D 2279/65; B01D 46/50; B03C 3/011; B03C 3/12; B03C 3/0175; B03C 3/09; B03C 3/368; B03C 3/47; B03C 2201/04; B03C 3/155; B03C 3/41
See application file for complete search history.

(56) References Cited

U.S. PATENT DOCUMENTS

| | | | | |
|---|---|---|---|---|
| 5,403,383 A * | 4/1995 | Jaisinghani | ............. | B03C 3/155 95/79 |
| 5,428,964 A * | 7/1995 | Lobdell | ................. | G05D 27/02 340/672 |
| 5,549,735 A * | 8/1996 | Coppom | ................. | B03C 3/155 96/88 |
| 5,593,476 A * | 1/1997 | Coppom | ................. | B03C 3/155 96/88 |
| 6,245,126 B1 | 6/2001 | Feldman et al. | | |
| 6,679,940 B1 * | 1/2004 | Oda | .......................... | B03C 3/84 96/96 |
| 7,156,898 B2 * | 1/2007 | Jaisinghani | ............. | B03C 3/155 55/497 |
| 7,258,729 B1 | 8/2007 | Barsimanto et al. | | |
| 7,513,933 B2 * | 4/2009 | Coppom | ................. | B03C 3/155 95/70 |
| 7,914,604 B2 * | 3/2011 | Mello | .................... | B03C 3/155 95/79 |
| 8,409,336 B2 | 4/2013 | Gatchell et al. | | |
| D742,496 S | 11/2015 | Carter | | |
| D774,634 S | 12/2016 | Hugues | | |
| D784,509 S | 4/2017 | Hugues | | |
| 9,789,494 B2 * | 10/2017 | Wiser, III | ................. | B03C 3/41 |
| D864,370 S | 10/2019 | Gallet et al. | | |
| D893,694 S | 8/2020 | Hugues et al. | | |
| 11,524,257 B2 * | 12/2022 | Wiser, III | ............... | F24F 8/158 |
| D992,714 S | 7/2023 | Bridgemohan | | |
| 2002/0056372 A1 | 5/2002 | O'Hara et al. | | |
| 2004/0070156 A1 | 4/2004 | Smith et al. | | |
| 2004/0129140 A1 | 7/2004 | Park et al. | | |
| 2005/0207951 A1 | 9/2005 | Leet et al. | | |
| 2006/0079172 A1 | 4/2006 | Fleming et al. | | |
| 2006/0096261 A1 | 5/2006 | Zhang | | |
| 2006/0150816 A1 * | 7/2006 | Jaisinghani | ............... | B03C 3/12 96/96 |
| 2007/0039462 A1 | 2/2007 | Helt et al. | | |
| 2007/0039472 A1 | 2/2007 | Bias et al. | | |
| 2008/0041138 A1 | 2/2008 | Marra | | |
| 2012/0124961 A1 | 5/2012 | Jarrier et al. | | |
| 2014/0353236 A1 | 12/2014 | Mann | | |
| 2015/0246308 A1 | 9/2015 | Lans | | |
| 2017/0246573 A1 | 8/2017 | Crabtree et al. | | |
| 2018/0066779 A1 | 3/2018 | Jaeger et al. | | |
| 2018/0154297 A1 | 6/2018 | Maletich et al. | | |
| 2018/0318747 A1 | 11/2018 | Poon et al. | | |
| 2019/0041079 A1 | 2/2019 | Kohn et al. | | |
| 2019/0117815 A1 | 4/2019 | Wei et al. | | |
| 2019/0234146 A1 | 8/2019 | Weightman | | |
| 2020/0061635 A1 * | 2/2020 | Wiser, III | .............. | B01D 39/10 |
| 2022/0314155 A1 | 10/2022 | Cusack | | |
| 2022/0339314 A1 | 10/2022 | Lobdell | | |
| 2022/0373202 A1 | 11/2022 | Lobdell | | |

FOREIGN PATENT DOCUMENTS

| | | |
|---|---|---|
| WO | 2015172369 A1 | 11/2015 |
| WO | WO 2022/032051 | 2/2022 |
| WO | WO 2022/212877 | 10/2022 |
| WO | WO 2022/232147 | 11/2022 |
| WO | WO 2022/245982 | 11/2022 |

OTHER PUBLICATIONS

PCT Application PCT/US2022/023108 International Search Report and Written Opinion dated Aug. 12, 2022.
PCT Application PCT/US2022/029885 International Search Report and Written Opinion dated Jul. 28, 2022.
HHPC-005CN Chinese Application No. 202230063845 Office Action dated Jun. 2, 2022.
U.S. Appl. No. 17/729,726, Vincent Lobdell, Disinfecting Air Filtrations System Configuration, filed Apr. 26, 2022.
PCT/US22/26353, Disinfecting Air Filtrations System Configuration, Apr. 26, 2022.
U.S. Appl. No. 17/711,734, Timothy G. Cusack, Front-Loaded Inline Modular Filtration System, filed Apr. 1, 2022.
PCT/US22/23108, Front-Loaded Inline Modular Filtration System, Apr. 1, 2022.
U.S. Appl. No. 17/747,840, Vincent Lobdell, Fan Powered Air Filtration Unit, filed May 18, 2022.
PCT/US22/29885, Fan Powered Air Filtration Unit, May 18, 2022.
PCT/US21/44872, V-Bank Filter, Aug. 6, 2021.
U.S. Appl. No. 29/813,637, Vincent Lobdell, V-Bank Filter, filed Oct. 29, 2021.
PCT Application PCT/US2021/044872 International Search Report and Written Opinion dated Nov. 9, 2021.
Extended European Search Report for European Application No. 21854189.4, mailed Aug. 16, 2024, 29 pages.

\* cited by examiner

V-BANK FILTER

CROSS-REFERENCE TO RELATED APPLICATIONS

The present disclosure claims priority benefits of U.S. provisional patent application 63/063,045 filed on Aug. 7, 2020, the disclosure of which is incorporated herein by reference.

BACKGROUND OF THE INVENTION

Field of the Disclosure

The present disclosure is generally related to filtering air. More specifically the present disclosure is directed to apparatus that filters air and to air filtering methods.

Description of the Related Art

Various types of air filtrations systems exist today. One type of conventional air filtration system forces air through a filter that captures particles. Another type of air filtration system captures particles on electrostatically charged plates disposed in a direction that is transverse or partially perpendicular to a direction of air flow. With the advent of COVID 19, concerns regarding viruses being from being transmitted through the air have led operators of conventional air filtration systems to use denser air filters. Since viruses have very small diameters that range, for example, from about 20 nanometers (nm) or 0.02 microns in diameter to about 500 nm (0.5 microns) in diameter, these denser air filters often rely on the use of very small holes to filter viruses out of the air. A problem associated with the use of such dense air filters is that in order to maintain a flow rate of air, greater air pressures must be applied by fans that force air through the filters. This increased air pressure increases power consumption, raises operating costs, and is noisy as compared to filtering apparatus that used less dense filters. This is because fans included in a filter apparatus must work harder in order to maintain a particular air flow when denser filters are used.

In certain instances, fans used in particular filtration may not be able to maintain a desired air flow rate, simply because these fans cannot provide enough pressure to force air through the denser filters at the desired flow rate. In such instances, operators of such apparatus have few choices, they may simply forget about it and allow the apparatus to move air at a lower flow rate, creating the lack of efficiency of the air conditioning and heating system they replace the fan of the air handler with a more powerful fan, or they may replace the entire air handler apparatus with a new air handler.

Another problem of simply using denser air filters is related to the fact that the harder a fan motor is driven, the faster that motor ages and as the motor ages, increased resistances may cause the mother to generate extra heat that will further age the fan motor. Over time, the aging of the fan motor can result in a fan no longer being able to move air at a desired flow rate. Ultimately, the use of denser air filters will also result in increased fan motor failure rates.

While electrostatic air filtration systems do help clean air when they are used, they do not completely filter the air. This is because much of the air that travels into an electrostatic air filter apparatus simply flows past plates included in the apparatus. Because of this, electrostatic air filtration systems do not efficiently filter the air. Even if filters were to be disposed perpendicular to the air flow before or after a location where electrostatic plates of an electrostatic air filter apparatus are located, such a filtration system would suffer from the same deficiencies as the conventional air filtration systems when denser filters are used. Electrostatic air filters also suffer from another problem in that many produce and release excessive ozone into spaces where they are located. Since ozone is known to cause inflammation, irritation, and damage to the respiratory tracts of people and animals, the release of ozone into a building provides a danger to the health of people and animals located inside of that building.

For all of the reasons mentioned above, what are needed are new methods and apparatus for filtering air effectively and efficiently while maintaining desired air flow rates with low pressure drop across the filter media. What is also needed is an apparatus that can capture viruses with a single pass efficiency and potentially degrade or destroy those viruses while maintaining a desired air flow rate.

SUMMARY OF THE PRESENTLY CLAIMED INVENTION

Embodiments of the presently claimed invention are directed to apparatus and methods for filtering air. In a first embodiment, an apparatus may be a V-Bank filter that includes one or more sections. Each of these one or more sections may include a shield that is connected to a ground potential, an electrical conductor connected to a voltage source that provides a voltage to the electrical conductor. The voltage provided to the electrical conductor may ionize particles in the air as those particles enter a first section of the V-Bank filter through the shield. This V-Bank filter apparatus may include several filter elements that each include filter media, a first grid, and a second grid. Here the filter media for each of the filter elements may be disposed between a respective first grid and a respective second grid. The first grid of each of the respective filter elements may be attached to the ground potential and the second grid of each of the respective filter elements may be electrically isolated from the first filter grid. An electric field may be disposed between the first and the second filter grids when the second filter grid is charged to a potential and when the electrical conductor is connected to the voltage source. The particles in the air may be trapped in the filter media when the second filter grid is charged to the potential.

In a second embodiment, a presently claimed method may include receiving air through one or more voids of a shield of a V-Bank filter. Particles included in the air may be ionized when the electrical conductor receives a voltage from a voltage source. These particles may then be captured in filter media of a first and a second filter element. Here the first and the second filter element may each include a respective first grid and a second grid and the particles captured in the filter media may be exposed to high energy based on an electric field generated between each of the respective first and second grids of the first and second filter elements when the electrical conductor receives the voltage from the voltage source.

In a third embodiment, an apparatus of the presently claimed invention may be a filter element that fits into a V-Bank filter apparatus. This filter element may include filter media that captures particles after those particles have been ionized, may include a first electrically conductive grid, and may include a second electrically conductive grid. Here the filter media may be disposed between the first and the second electrically conductive grid, the first electrically conductive grid may be connected to a ground reference potential, and the second electrical conductive grid may be charged to a potential. Particles trapped in the filter media may be exposed to high energy based on the charged potential being different than the ground reference potential.

DETAILED DESCRIPTION

The present disclosure is directed methods and apparatus of a V-Bank filtration system capable of maintaining desired air flow rates while effectively filtering the air. These methods and apparatus charge particles and then capture those particles in a filter medium. Once captured in the filter medium, micro-organisms are exposed to high energy electric fields that may degrade and ultimately destroy the captured micro-organisms. Electric fields generated within portions of the V-Bank filter apparatus may also be contained within the portions of the filter apparatus based on exterior parts of these portions being grounded at Earth ground potential. Magnetic fields (or electro-magnetic fields) associated with the generated electric fields may also be contained within the portions of the apparatus based on the exterior parts of these portions being grounded.

The electric fields may be electrostatic fields generated by a voltage source that provides a constant direct current (DC) voltage. Alternatively, the electric fields may be generated by an alternating current voltage source.

These V-Bank filters are part of a forced air system or self contained system utilizing its own blower, where air enters into a particular filter bank by passing through a shield that may be made in the form of a metallic grid. A conductor, such as a wire may be located at an inside portion of the filter bank. The shield disposed on the input of the bank filter will typically be grounded and may have a grid size smaller than the width of a finger or hand of a person. Because of this the shield serves two purposes, it prevents people from touching a high voltage conductor because of the grid size and it prevents electric or magnetic fields from exiting the filter bank because the shield is grounded. As such, the shield and other surfaces of the V-Bank filter may act as a Faraday cage.

As particles enter the V-Bank filter through a grounded shield, those particles may be ionized by the conductor charged to the high voltage. The ionized particles will travel with the air flow, potentially following electric or electro-magnetic field gradients toward outputs of the bank filter where filters that include a filter material trap the particles. These filters may also include features that help charged particles be captured within the filter material.

Each of the filter panels included in the V-Bank filter apparatus may include two different electrically conductive grids where the filter material is disposed between these two different electrically conductive grids. These two electrically conductive grids may be electrically isolated from each other based on the filter material/media being insulative or electrically non-conductive. Here a first electrically conductive grid may be charged to a potential and a second electrically conductive grid may be electrically connected to a ground connection. The first electrically conductive grid may be charged by electric fields emanating from a wire disposed at a point located before the filter in the V-Bank filter subassembly and/or by charged particles impacting the first electrically conductive grid with the flow or air. In certain instances, the first electrically conductive grid may be electrically connected to a high voltage potential that charges that grid. Since this first electrically conductive grid is typically charged to a high voltage potential, it is also referred to as a high energy transfer grid in this disclosure.

A second or outer electrically conductive grid of the filter may be electrically insulated from the first electrically conductive (i.e. high energy transfer) grid of the filter and this second electrically conductive grid may be grounded. When the first electrically conductive grid is charged to an electrical potential and since the second electrically conductive grid is at ground potential, an electric field gradient will exist in the filter material because the filter material is disposed between the first and the second electrically conductive grids that are at different electrical potentials. This electric field gradient may be strong enough to stress, degrade, and potentially destroy micro-organisms that are exposed to the electric field. Apparatus of the present disclosure may be referred to as a disinfecting filtration system because of this ability to stress, degrade, and potentially destroy micro-organisms.

Typically, a V-Bank filter will contain multiple banks, each bank may have a V shape and each including two filter panels. A V-Bank filter subassembly may include a total of 4 or 5 banks and eight filter panels or 10 filter panels. Each of these banks may include a charging wire that charges each of two first electrically conductive grids of a first filter and a second filter. In certain instances, a bank (or section) of a V-Bank filter may include an electrically conductive wire at a first potential that ionizes particles as they enter the bank of the V-Bank filter.

In certain instances, a high energy transfer grid may include an electrical connection to a power supply. Here a voltage potential/level provided to the wire may be different than the voltage potential/level provided to the first electrically conductive (high energy transfer) grid.

Particles exposed to the electric fields, magnetic fields, electro-magnetic fields, and/or electric field gradients will tend to clump together such that they can be captured in the filter material more easily. This may allow a density of the filter material to be reduced while that filter material still captures small micro-organisms based on the clumping of the particles. This may allow filter materials that are four to five times less dense as compared to filter materials be used to capture viruses in a conventional air filter.

Figure 1:
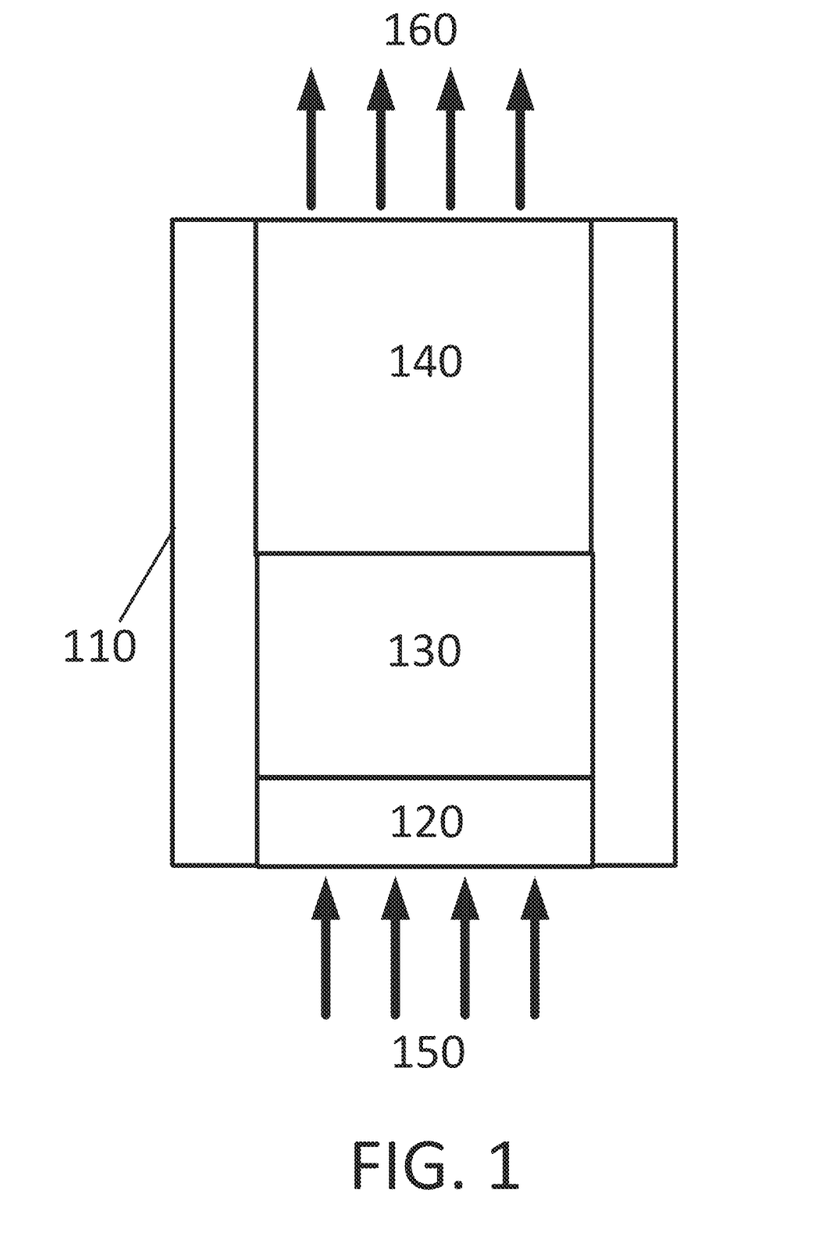
FIG. 1 illustrates an air filtration system that includes a pre-filter coupled to a blower assembly and a V-Bank filter subassembly.

FIG. 1 illustrates an air filtration system that includes a pre-filter coupled to a blower assembly and a V-Bank filter subassembly. The filtration system 110 illustrated in FIG. 1 includes pre-filter 120, blower assembly 130, and V-Bank filter subassembly 140. The filtration system 110 may be coupled to parts of a building or to ducting through which air is circulated or moved.

Arrows 150 show that air is drawn into pre-filter 120 and arrows 160 indicate that air exits the V-Bank filter at a different end of filtration system 110. Here the air drawn into the filtration system 110 may pass through pre-filter 120, blower assembly 130, and V-Bank filter 140 when the air is filtered. While FIG. 1 illustrates the blower assembly 130 being located between the pre-filter 120 and the V-Bank filter 140, it may be located before anywhere upstream or downstream from the respective filters 120 or 140.

An air filtration system that includes the V-Bank filter subassembly of FIG. 1 may also be referred to as electrically enhanced filtration (EEF) air purification system that uses two mechanisms to maintain high air cleaning performance. The DFS high energy field creates a self-contained, highly ionized state in one or more main filters that aggregates or clusters ultrafine particles to make them larger, allowing the main filters to effectively capture ultrafine particles. The high energy field is controlled, and self-contained between the entry ground control grid before a main filter and a rear control grid affixed to the rear of the main filter. All ions generated by the high energy field may be isolated in the main filter between the entry control grid and exhaust control grid on the rear of the filter. This may prevent ions from being exhausted from the DFS system. This apparatus may use either positive ions or negative ions, yet may use positive ions to mitigate the generation of ozone. Even if ozone is generated in the apparatus, this ozone may be neutralized based on a ground field that surround locations of the apparatus where the ions are created.

The controlled, isolated high energy field generated by the DFS continually creates high energy exposure through pleats and/or fibers of the main filter media creating a microbiostasis ("prevention of organism growth") in such a main filter. This may help prevent live organisms from escaping back into the air. These two mechanisms may work together to provide the ultraclean filtration of particles as well as continual prevention of organism growth in a DFS filter.

The DFS may include several elements, including a pre-filter that captures large particles. The pre-filter in this system will typically have a minimum efficiency reporting value (MERV) rating of at least MERV 8, but could be lower in certain applications. The minimum size of particles captured by the prefiltration process can vary depending upon the application and the resistance to air flow capacity of the HVAC system. The filter media fibers are continually being exposed the high energy field creating microbiostatis effect in the media. A particular filter design may include a pre-filter and V-Bank filter elements that each include their own respective high voltage filtration elements. In such an instance, the pre-filer as well as each set of V-Bank filter banks/sections may include their own respective charging wires, high energy transfer-grids, and set of grounded grids that electrically isolate each respective filter. A such, a DFS filter system could include different sets of filter elements connected in a serial configuration.

Filtration apparatus 110 may use filter media that is of a lower density than typical filtration systems with similar filtration. The V-bank filter 140 may have a less dense media (for example 97 Dispersed Oil Particulate (DOP) as compared to the standard HEPA filter (99.97 DOP). This allows the filters to have a higher gram holding weight and thus allow for more dust holding capacity as compared to a standard HEPA filter and results in increased filter life. HEPA filters also offer much higher resistance as compared to these V-bank filters.

A pressure drop for the V-Bank filter is almost quarter as compared to conventional HEPA systems at the time of installation (0.25-0.3 inches of water column for the V-Bank filters as compared to 1.0 inches of water column for the HEPA filters at the time of installation). The filter media fibers may continually be exposed the high energy field creating microbiostatis effect in the media. The end result, depending on the efficiency of the traditional media used, may be as follows: much higher particulate efficiency than traditional media filters and with fan powered machines, a 99.99% at 0.002-micron filtration efficiency, with a greater gram holding weight capacity, resulting in greater lifetime performance, less maintenance, and lower energy use/cost. The technology has been proven to enable a penetration reduction of 2-3 orders of magnitude of air flow as compared to standard heap filter configurations.

Figure 2:
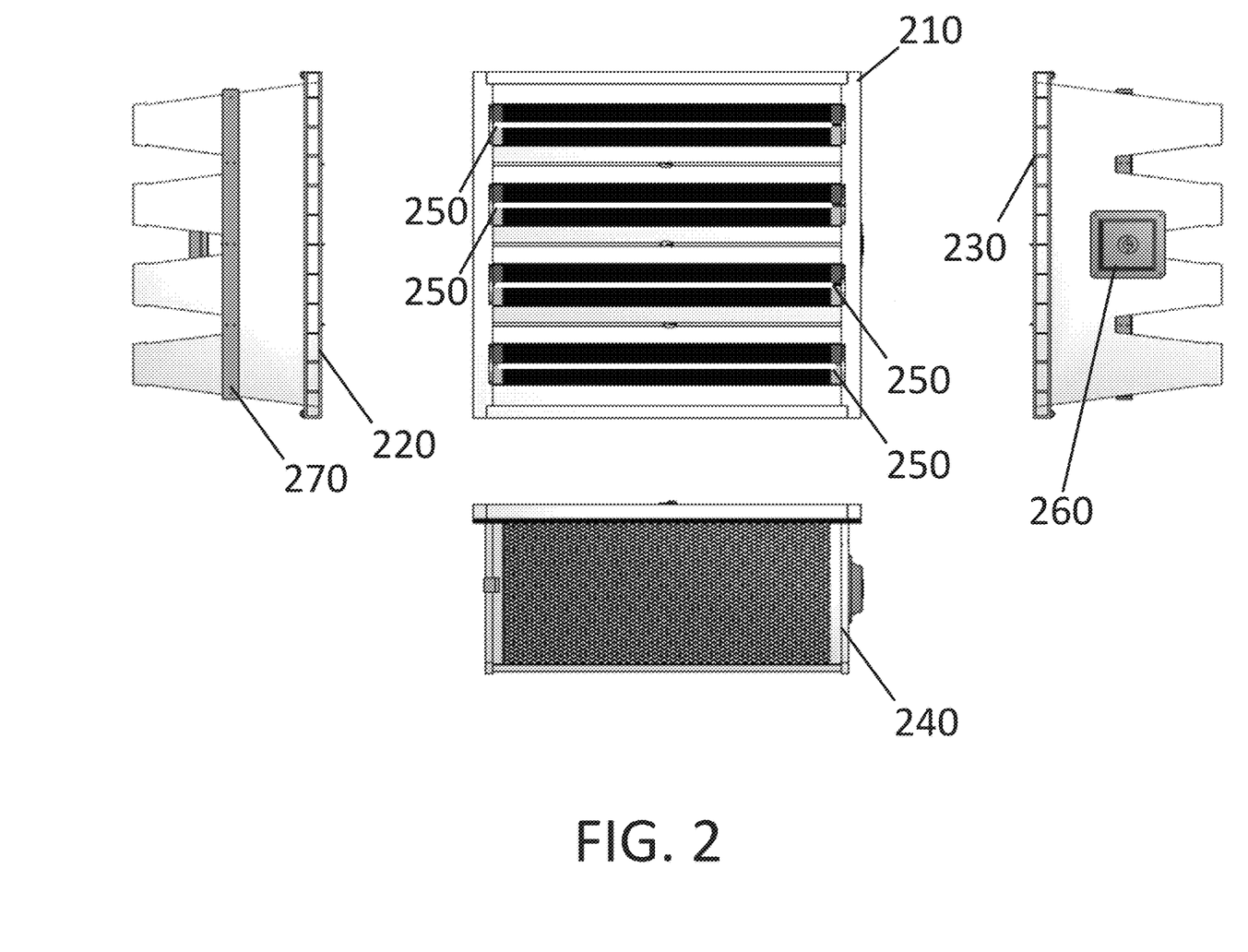
FIG. 2 illustrates a V-Bank filter subassembly that may be used to filter or purify air.

FIG. 2 illustrates a V-Bank filter subassembly that may be used to filter or purify air. As mentioned above, this filtering apparatus may form a disinfecting filtration system (DFS) because of the high energy electric field generated by the wires included in the V-Band filter. FIG. 2 illustrates a front view 210, a first side view, 220, and a second side view 230 of the V-Bank subassembly 140 of FIG. 1. Note the side views 220 and 230 include four sections (i.e. filter banks) that have a V like shape. Each of these sections may contain two different filter elements 240 located on opposite sides of each of the different V shaped sections/filter banks.

FIG. 2 includes an electrical contact pad 260 is located on the V-bank filter subassembly exterior side view 230. Contact pad 260 may be used to provide power to the white colored wires 250 of the V-Bank filter subassembly. A control unit may be used to controllably distribute high amounts of energy via contact pad 260 from a high energy power supply to wires 250. Note that each respective V shaped section of the V-Bank filter may include a high energy wire 250 that traverses from a left side to a right side of openings in each respective V shaped section. The high energy wires may be electrically isolated from a front ground control grid with insulators. Such a front ground control grid may have a grid size that prevents a person from reaching into the V-Bank filter and touching the high energy wires 250. Each of the wires 250 may charge and ionize incoming air particles.

FIG. 2 includes filter element 240 and numerous of these filter elements may be installed in a V-Bank filter subassembly. Filter element 240 may include a high energy transfer grid that may be made of an electrically conductive material. Since the V-Bank filter of FIG. 2 includes four V shaped sections, and each section contains 2 filters 240, the V-Bank filter of FIG. 2 includes 8 filter elements 240. The aforementioned high energy transfer grids may be glued to the filter media and may be charged by an electric field produced by wires 250. During the process, 0.002-micron and larger substances are captured and microorganisms trapped in the filter where those microorganisms are degraded or destroyed based on the application of a high voltage electric field (e.g. a 4 thousand volts (Kv) to 18 Kv electric field) provided by the high energy transfer grids. The transfer grids may cover 95% of a surface of filters 240. The transfer grids included in the filters 240 only slightly increase the resistance of the filter element 240.

A number of rear ground control grids, in this embodiment there are eight or 10 (depending on the number of filter panels), are located on the one side of the filter. They may be glued to the filter media and grounded using ground bar 270. The rear ground control grid helps to move 0.002-micron particles as much as possible into the media. The rear ground control grid also eliminates the electrostatic field effects outside the filter media element 240. Ground bar 270 is located a side of the V-Bank filter that may be perpendicular to the air flow. Ground bar 270 may electrically connect to each ground control grid of filter element 240 of FIG. 4.

Figure 3:
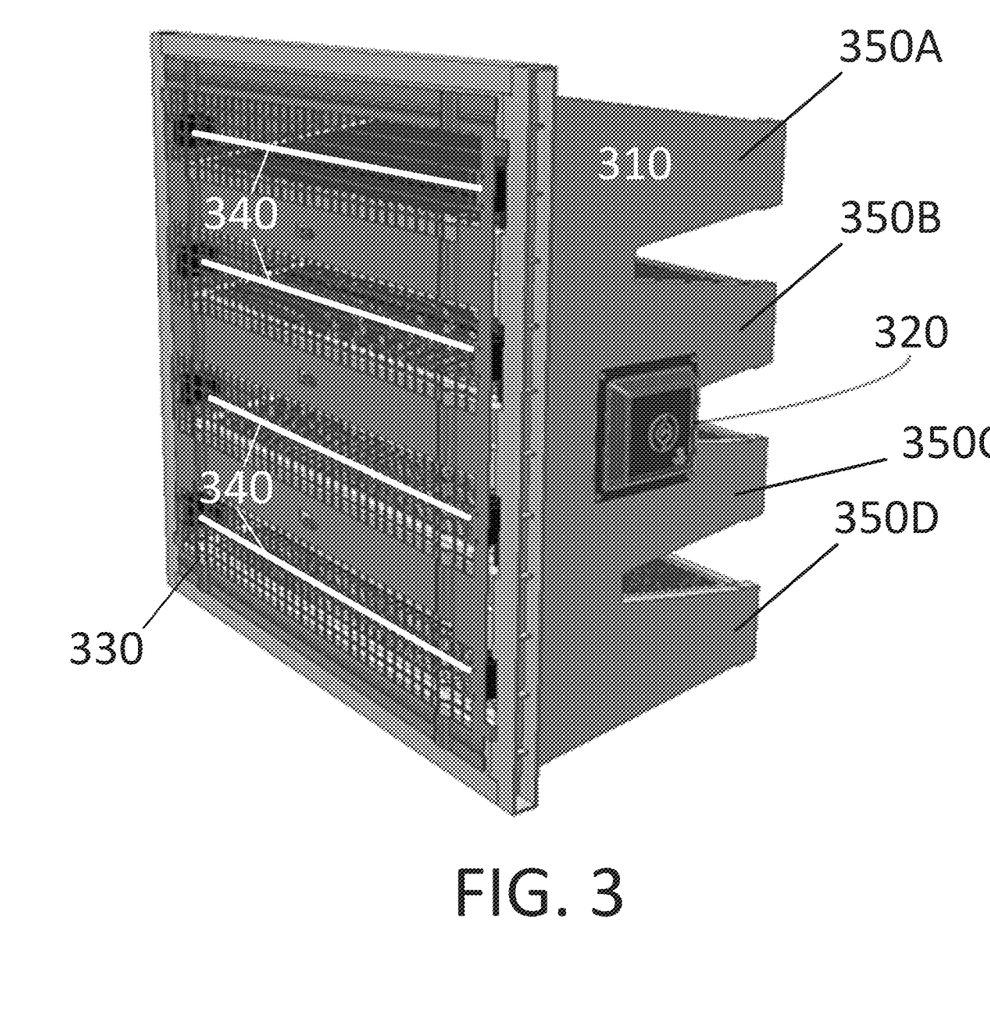
FIG. 3 illustrates a first perspective view of a V-Bank filter subassembly that includes a high voltage input and high voltage wires that may be used to ionize particles entering the V-Bank filter.

FIG. 3 illustrates a first perspective view of a V-Bank filter subassembly that includes a high voltage input and high voltage wires that may be used to ionize particles entering the V-Bank filter. The V-Bank filter subassembly 310 of FIG. 3 includes high voltage input 320, protective shield/grid 330, and high voltage wires 340. Each of the four different high voltage wires 340 are located immediately behind shield/grid 330. As mentioned above shield/grid 330 may have a mesh size that is smaller than the width of a finger or hand of a person. Such a mesh may prevent a person from reaching through the shield and touching an energized wire 340. When the V-Bank subassembly of FIG. 3 is assembled within air filtration system, high voltage input 320 may be electrically connected to a circuit/power supply that supplies energy to wires 340.

The V-Bank subassembly of FIG. 3 also includes four or five different V shaped sections 350A, 350B, 350C, & 350D. As illustrated in other figures of this disclosure, each of these different V shaped sections 350A-350D may each include two different filters that may be removed and replaced without having to touch or move a wire.

Figure 4:
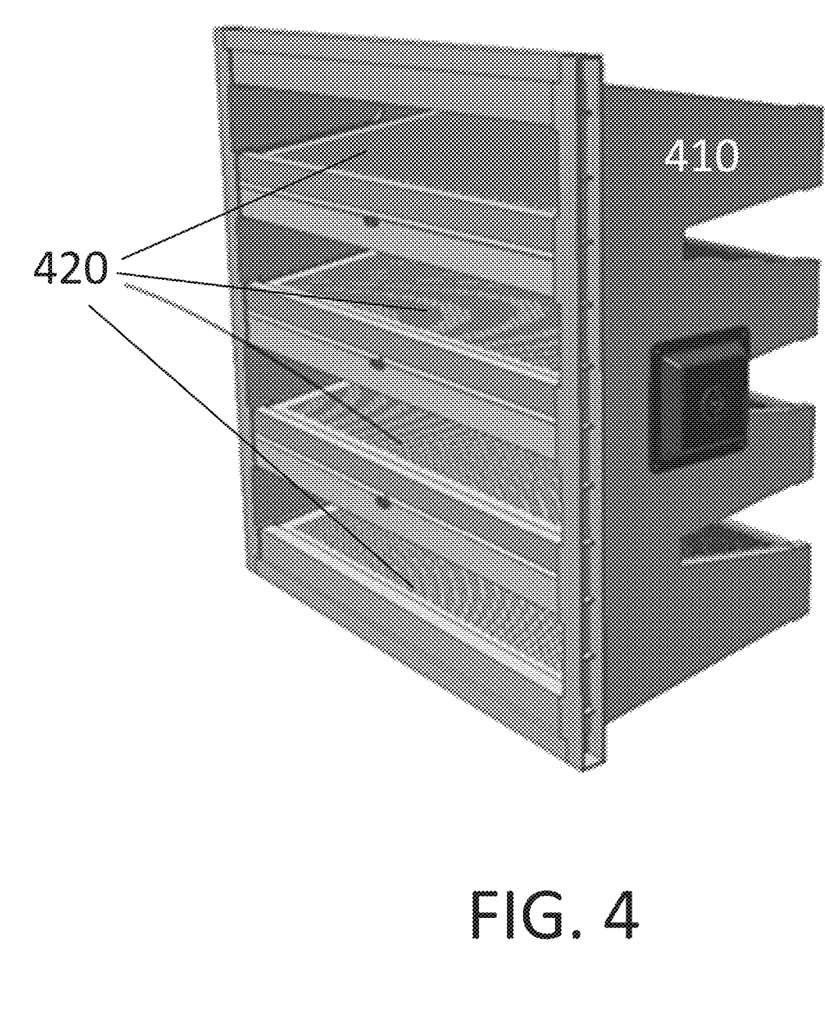
FIG. 4 illustrates a second perspective view of the V-Bank subassembly illustrated in FIGS. 1-2.

FIG. 4 illustrates a second perspective view of the V-Bank subassembly illustrated in FIGS. 1-2. Here, however the protective shield/grid and conductive wires illustrated in FIG. 3 are removed. The V-Bank filter 410 of FIG. 4 includes four different filter elements 420. These filter elements may include filter material disposed between two different grids, a first grid that is electrically charged and a second grid that is connected to ground when the V-Bank filter is in operation.

Figure 5:
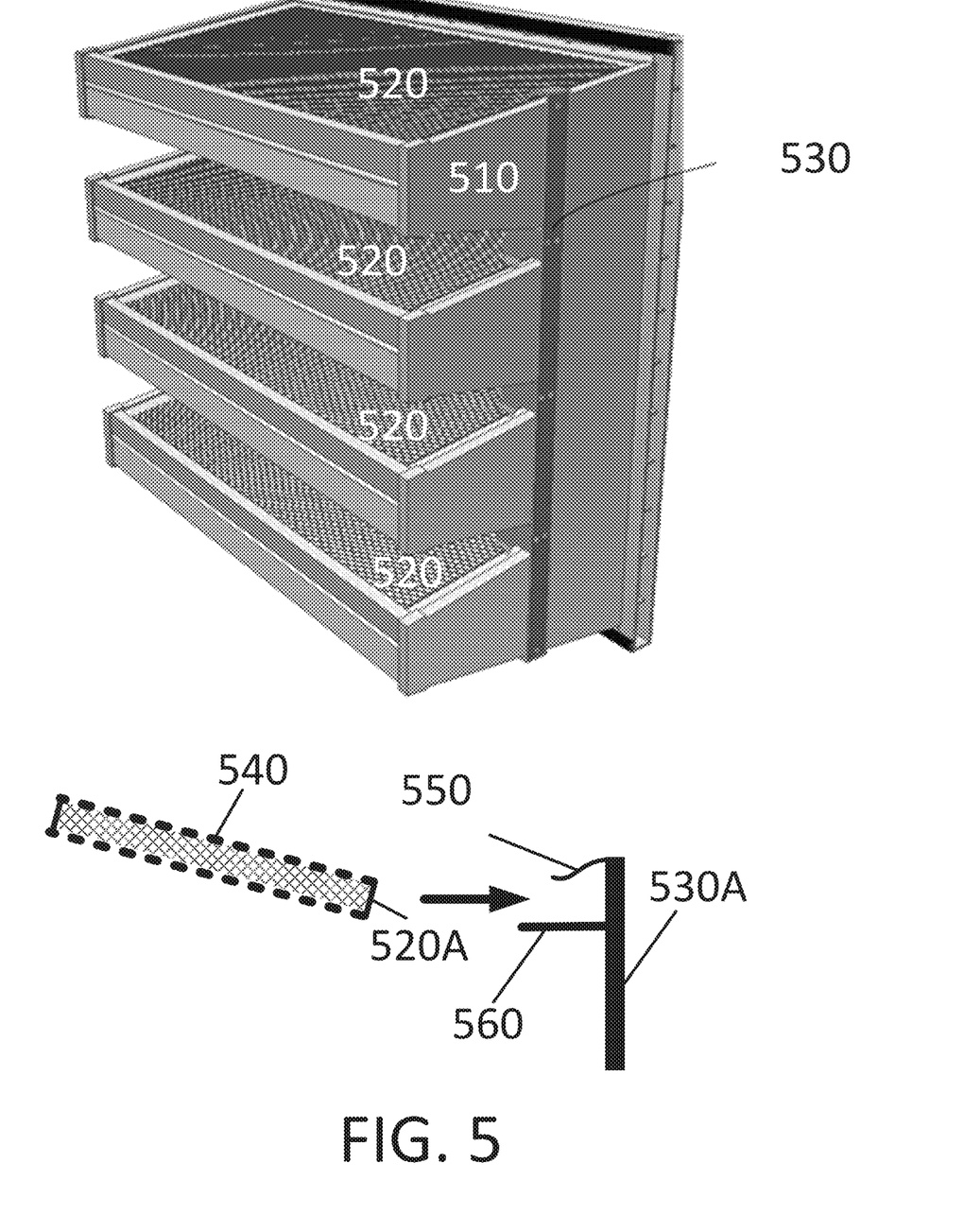
FIG. 5 illustrates a third perspective view of a back side of a V-Bank filter subassembly.

FIG. 5 illustrates a third perspective view of a back side of a V-Bank filter subassembly. The V-Bank subassembly 510 of FIG. 5 includes filter elements 520 that each have an outer ground control grid 540 that are electrically connected to ground strap 530. Here ground strap 530 may be connected to an Earth ground connection such that each of the ground control grids of filters 520 may be grounded. FIG. 5 also illustrates a portion of ground strap 530 identified as item 530A that has a clip 550 attached to ground strap 530A. This portion of FIG. 5 includes filter element 520 that includes a surface 540 that comes into contact with clip 550 when filter element 520A is installed in V-Bank filter 510. Item 560 of FIG. 5 may be an edge that supports filter element 520A when that filter element is installed in the V-Bank filter. To install filter element 520A into V-Bank filter 510 a user could simply rotate the filter element and slide that filter element between edge 560 and clip 550 along a direction shown by the arrowed line of FIG. 5. Once filter element 520A is slid between edge 560 and clip 550, filter element 520A could be rotated to fit into V-Bank filter 510. Such a configuration would allow the user to install a filter without needing to remove and attach a conductor or wire to surface 540 of filter element 520A. When ground strap 530 is attached to a ground potential (i.e. a ground reference point) and when surface 540 is an electrically conductive grid, clip 550 would ground surface 540 of filter element 520. A spring force of clip 550 could also help hold filter element 520 in place. While not illustrated in FIG. 5, a seal could be formed between edge 560 and filter element 520 to prevent air from moving around instead of through filter element 520.

Figure 6:
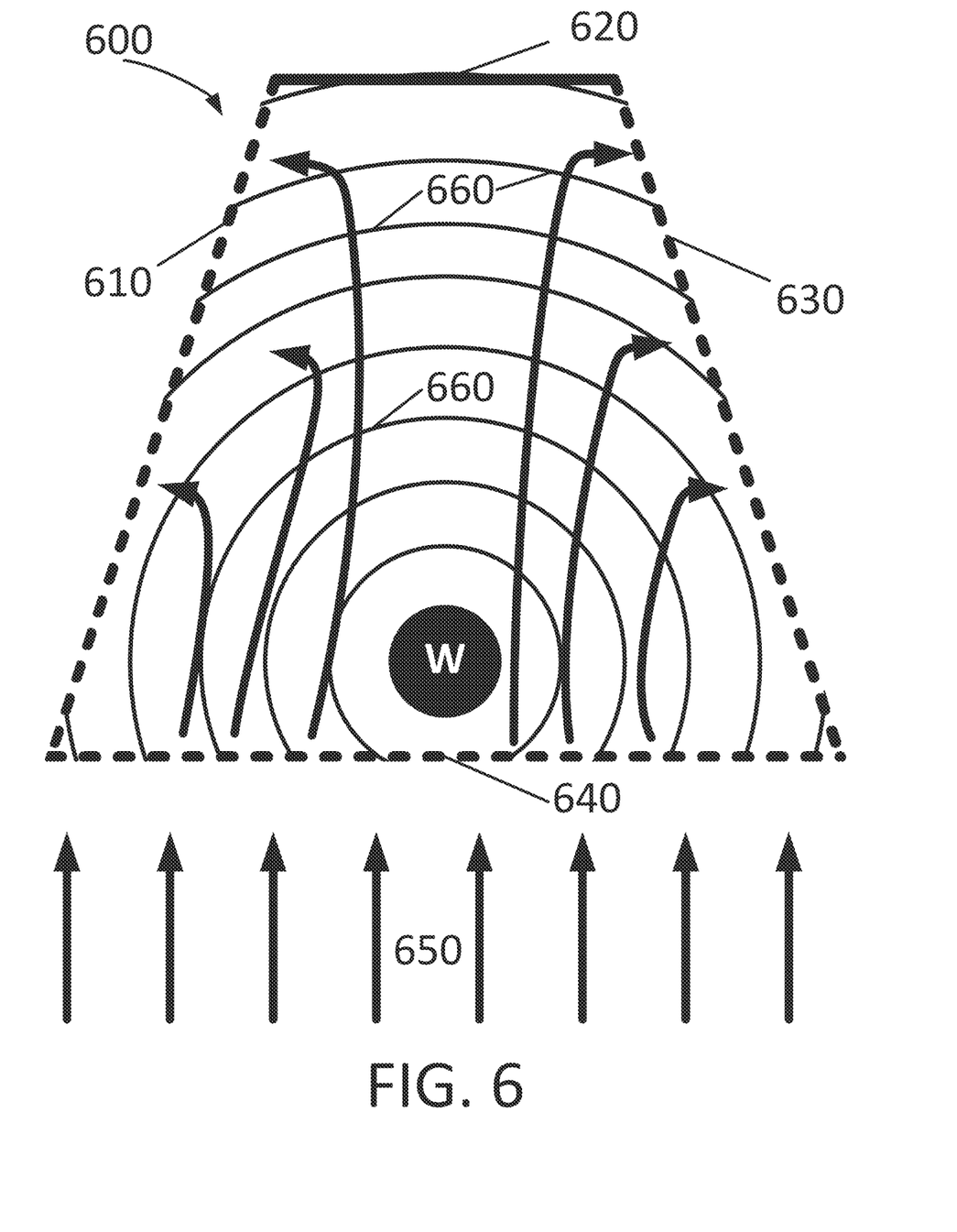
FIG. 6 illustrates a cross-sectional view of a portion of a V-Bank filter.

FIG. 6 illustrates a cross-sectional view of a portion of a V-Bank filter. The portion/section of the V-Bank filter 600 of FIG. 6 may be one of the V shaped sections of the V-Bank filter discussed above. Note that the portion of the V-Bank filter includes four different sides 610, 620, 630, and 640, where sides 610, 620, and 640 include grounded grids that allow airflow. FIG. 6 includes wire W and electrical field illustrated as circular or semi-circular lines 660 that radiate away from wire W. Electric field 660 is generated by a high voltage that is applied to wire W. Note that electric field 660 begins at wire W and is contained within the portion 600 of V-Bank filter because each of the sides 610, 620, 630, and 640 are grounded. FIG. 6 also includes straight arrow lines 650 and curved arrow lines 660 within the portion 600 of the V-Bank filter. These straight lines 650 and the curved lines of FIG. 6 correspond to airflow of a V-Bank filter. Once the air enters through grid 640, it will be exposed to electric field 660 that may charge or ionize particles in the air. These charged particles may then flow with the air flow along electric field gradients to filter elements included in side portions 610 and 630 of FIG. 6. These filters may trap the particles and allow air to exit the V-Bank filter portion 600 along sides 610 & 630 after the air has passed through filters. Each of the sides 610, 620, & 640 may allow the air to flow into and out of the V-Bank filter portion/section 600 of FIG. 6.

Figure 7:
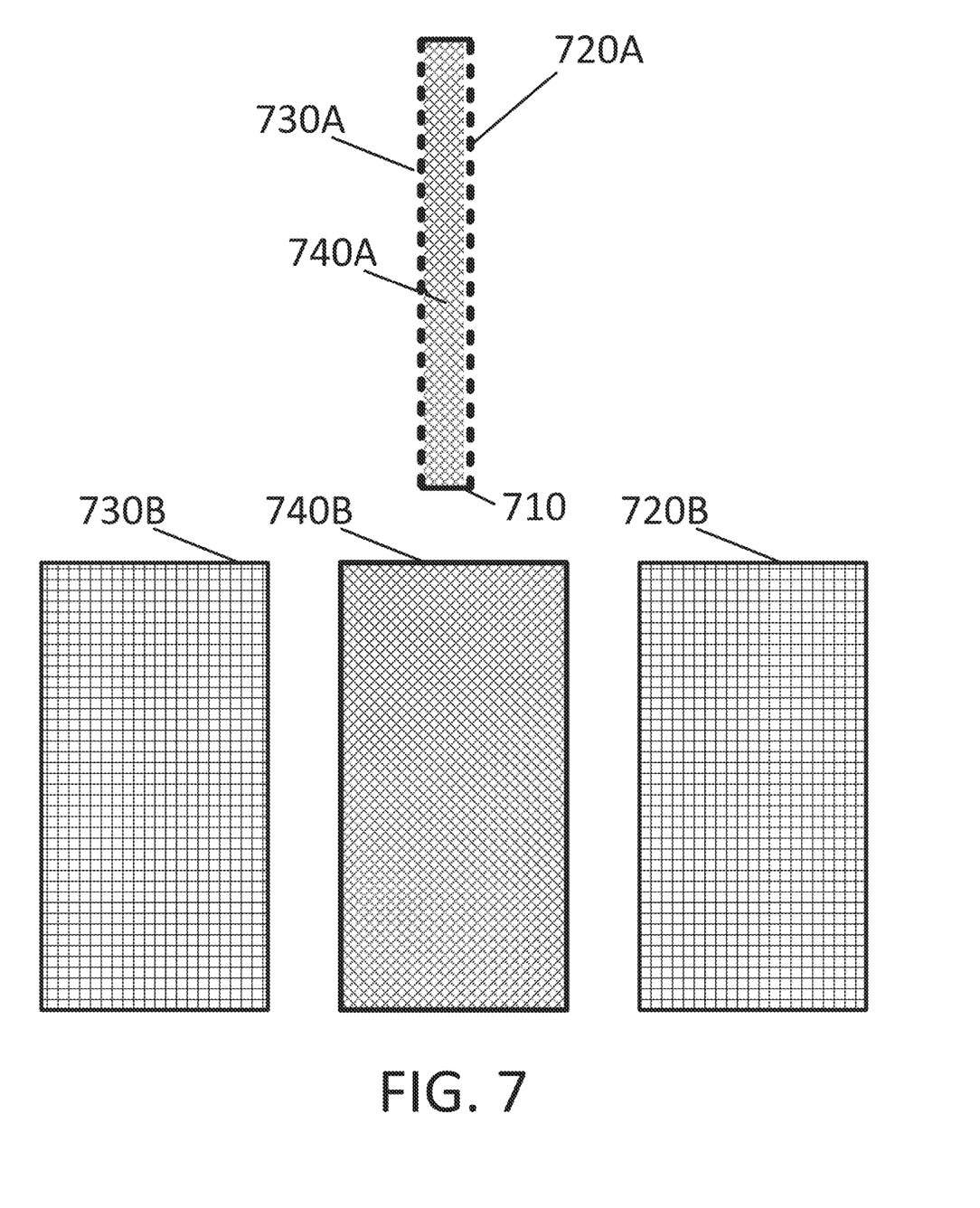
FIG. 7 illustrates a filter element that may be used to filter particles out of an air stream.

FIG. 7 illustrates a filter element that may be used to filter particles out of an air stream. The filter element 710 of FIG. 7 includes a first grid 720A, a second grid 730A, and filter media 740A. A first grid of the grids 720A & 730A of filter element 710 may be connected to ground and the second grid may be charged to a high voltage when filter element 710 is installed in a V-Bank filter.

FIG. 7 also includes parts of a disassembled filter. Items 720B and 730B may be the same grids 720A and 730A of filter element 710. Item 740B may be a filter media like the filter media 740A. Each of the grids 720A/B and 730A/B may be electrically conductive.

Figure 8:
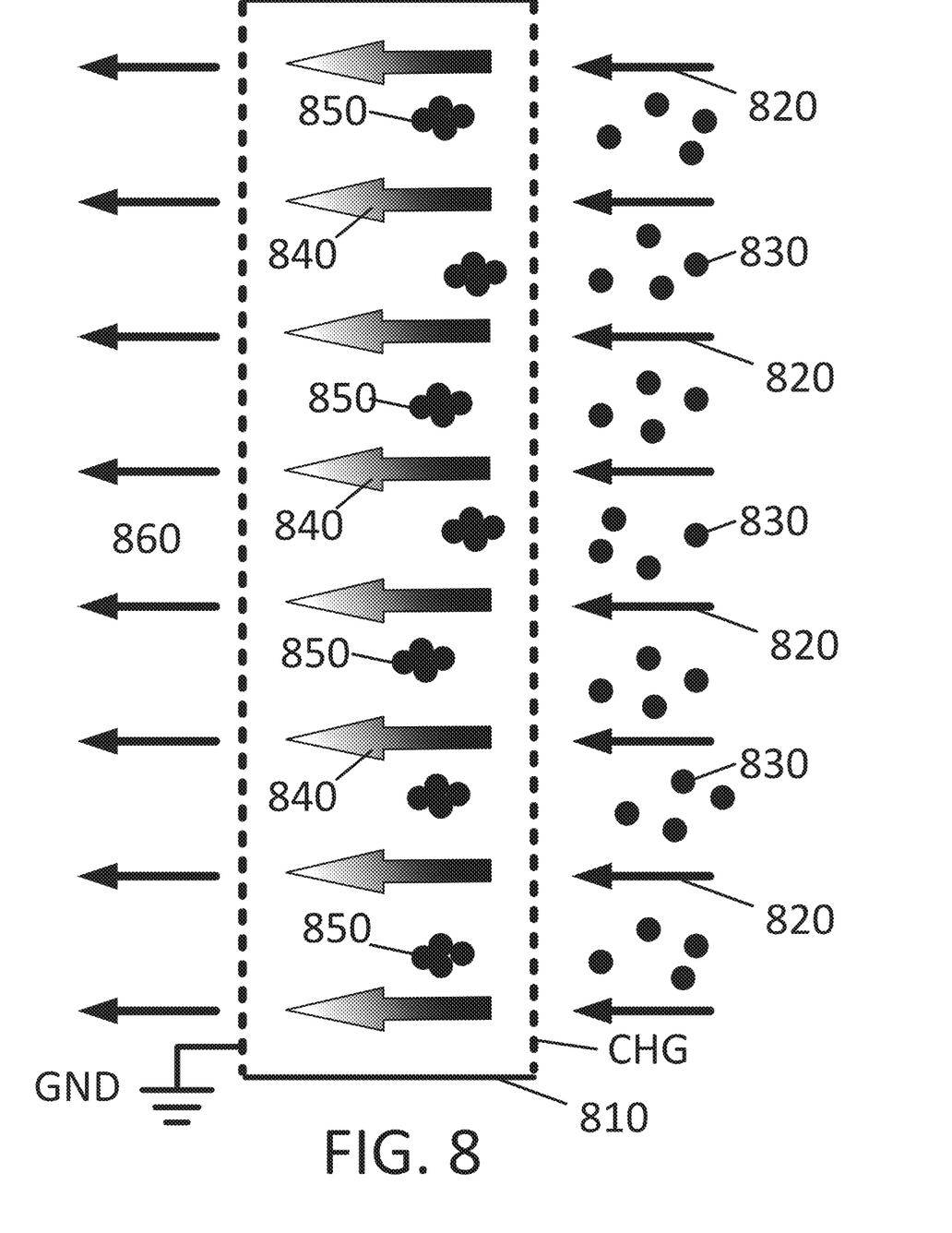
FIG. 8 illustrates a cross-sectional view of a filter element when that filter element is being used to disinfect trapped particles.

FIG. 8 illustrates a cross-sectional view of a filter element when that filter element is being used to disinfect trapped particles. Arrows 820 illustrates air flowing into filter element 810 and arrows 860 illustrate air flowing out of filter element 810. Particles 830 included in air flow 820 flow into filter element 810. The dashed lines on the right side of filter element 810 are a grid that is charged to a high voltage (CHG) and the dashed lines on the left side of filter element 810 are a grid that is connected to ground GND. The large arrows 840 of FIG. 8 represent an electric field or electric field gradient that extends through filter media included in filter element 810. Here again this filter media is disposed between two grids (the charged grid and the grounded grid). The electric field in the filter and in an associated V-Bank filter may ionize particles 830 such that they clump together into clusters 850 and be trapped in the filter media. This clustering of the particles allows a less dense filter media be used to filter small particles. This allows filter media that include relatively larger holes to trap particles that are smaller than holes included in the filter media. Once trapped, any microorganisms included in the particles may be degraded by electric field 850.

As mentioned previously, a charged grid may be charged by various mechanisms, by the electric field, by charged particles impacting the grid, or the grid may be connected to a voltage source. Electrical contacts to a ground grid or to a high voltage grid may be transferred through clips that attach to one of the grids.

The foregoing description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A V-Bank filter apparatus, the apparatus comprising:
a pre-filter through which an airflow passes, wherein the pre-filter includes a pre-filter electrical conductor configured to ionize particles in the airflow as the particles enter the pre-filter; and
a main filter including one or more sections that receive the airflow after the airflow passes through the pre-filter, each one of the one or more sections including:
a metallic shield connected to a ground potential through which the airflow passes into the section;
an electrical conductor configured to be connected to a voltage source that provides a voltage to the electrical conductor, the electrical conductor located within the section and the electrical conductor being different from the pre-filter electrical conductor, the voltage provided to the electrical conductor creating an electric field that ionizes particles included in the airflow passing through the section; and
a plurality of filter elements, each filter element including a filter media disposed between a first filter grid that is connected to the ground potential and a second filter grid that is electrically isolated from the first filter grid, wherein:
the electric field is disposed between the second filter grid and the first filter grid based on the second filter grid being charged to a potential and the first filter grid being connected to the ground potential when the voltage is provided to the electrical conductor by the voltage source, and
the ionized particles in the airflow passing through the section are trapped in the filter media when the second filter grid is charged to the potential.

2. The apparatus of claim 1, further comprising a ground strap electrically connected to the first filter grid of each of the plurality of filter elements of each one of the one or more sections.

3. The V-Bank filter apparatus of claim 2, wherein the ground strap is also electrically connected to an exterior of the V-Bank filter apparatus.

4. The apparatus of claim 2, further comprising, in each section of the plurality of sections of the main filter, a contact that electrically connects the ground strap to the first filter grid of a first filter element of the section when the first filter element is attached to the section.

5. The apparatus of claim 1, further comprising a second section of the one or more sections that receives a second airflow.

6. The apparatus of claim 1, further comprising a plurality of additional sections of the one or more sections, each receiving a respective airflow.

7. The apparatus of claim 1, wherein the electrical conductor is a wire.

8. The apparatus of claim 1, wherein the voltage provided to the electrical conductor is greater than ten thousand volts.

9. The apparatus of claim 1, wherein the pre-filter includes a third filter grid, a fourth filter grid, and filter material disposed between the third filter grid and the fourth filter grid, wherein the filter material of the pre-filter is configured to trap particles larger than a first size, and wherein the filter media of the sections of the main filter is configured to trap particles larger than a second size the second size being smaller size than the first size.

10. The apparatus of claim 9, wherein the third filter grid is charged to a voltage and the fourth filter grid is connected to the ground potential.

11. The apparatus of claim 1, wherein the each section of the one or more sections of the main filter of the V-Bank filter apparatus includes two filter elements.

12. The apparatus of claim 1, wherein a pressure drop of the V-Bank filter apparatus does not exceed 0.5 inches of water column.

13. The apparatus of claim 1, wherein the shield includes a plurality of voids through which the first portion of air flows.

14. The apparatus of claim 1, further comprising a blower disposed in the airflow between the pre-filter and the main filter, the blower configured to generate the airflow through the pre-filter and through the main filter.

* * * * *